Oct. 28, 1952   R. A. FARRELL ET AL   2,615,377
APPARATUS FOR MAKING SEALED PACKAGES
Filed May 10, 1949   17 Sheets-Sheet 1

Inventors
William G. Mueller
Robert A. Farrell
and August Bartes Jr.
By William S. Nordberg
Atty.

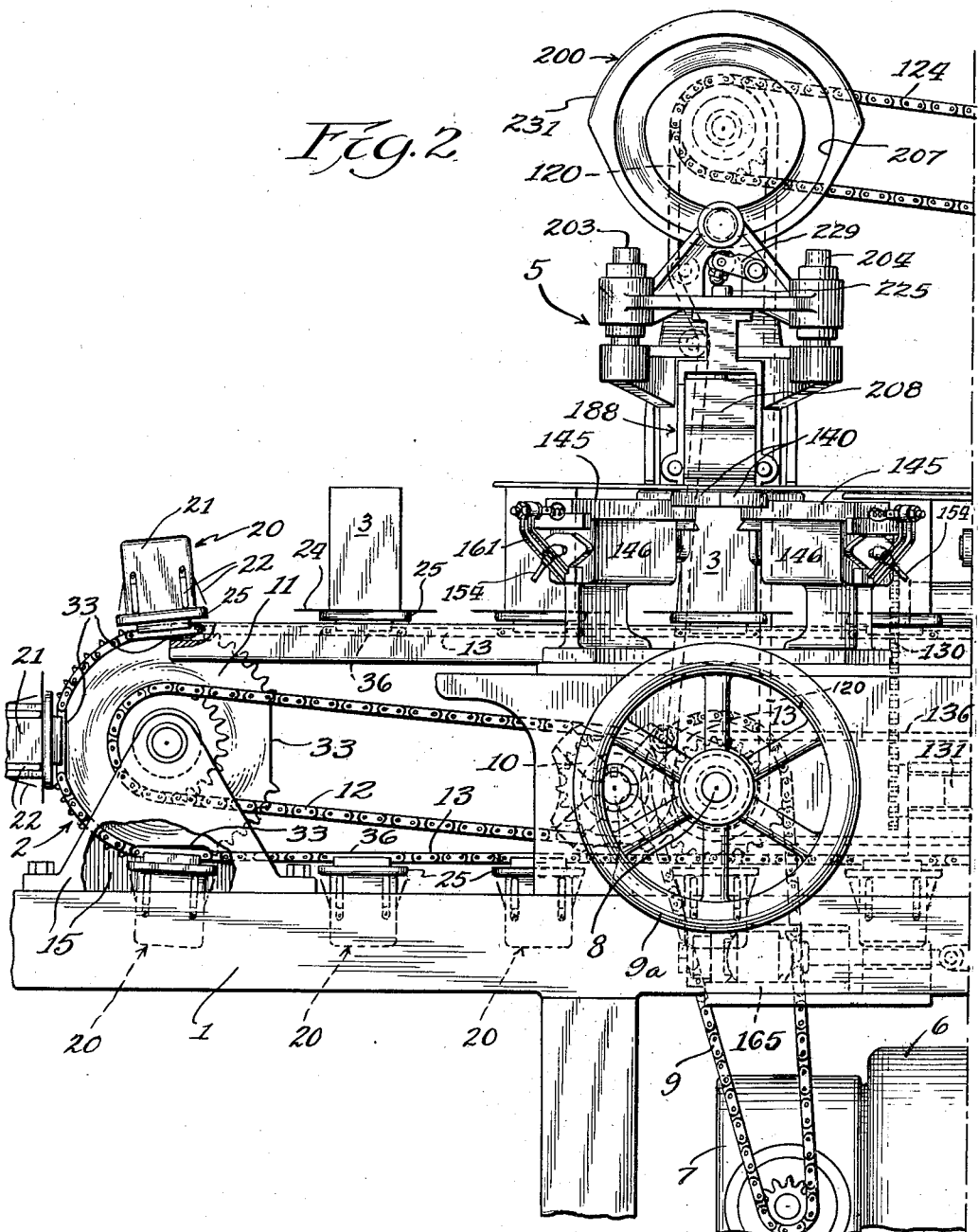

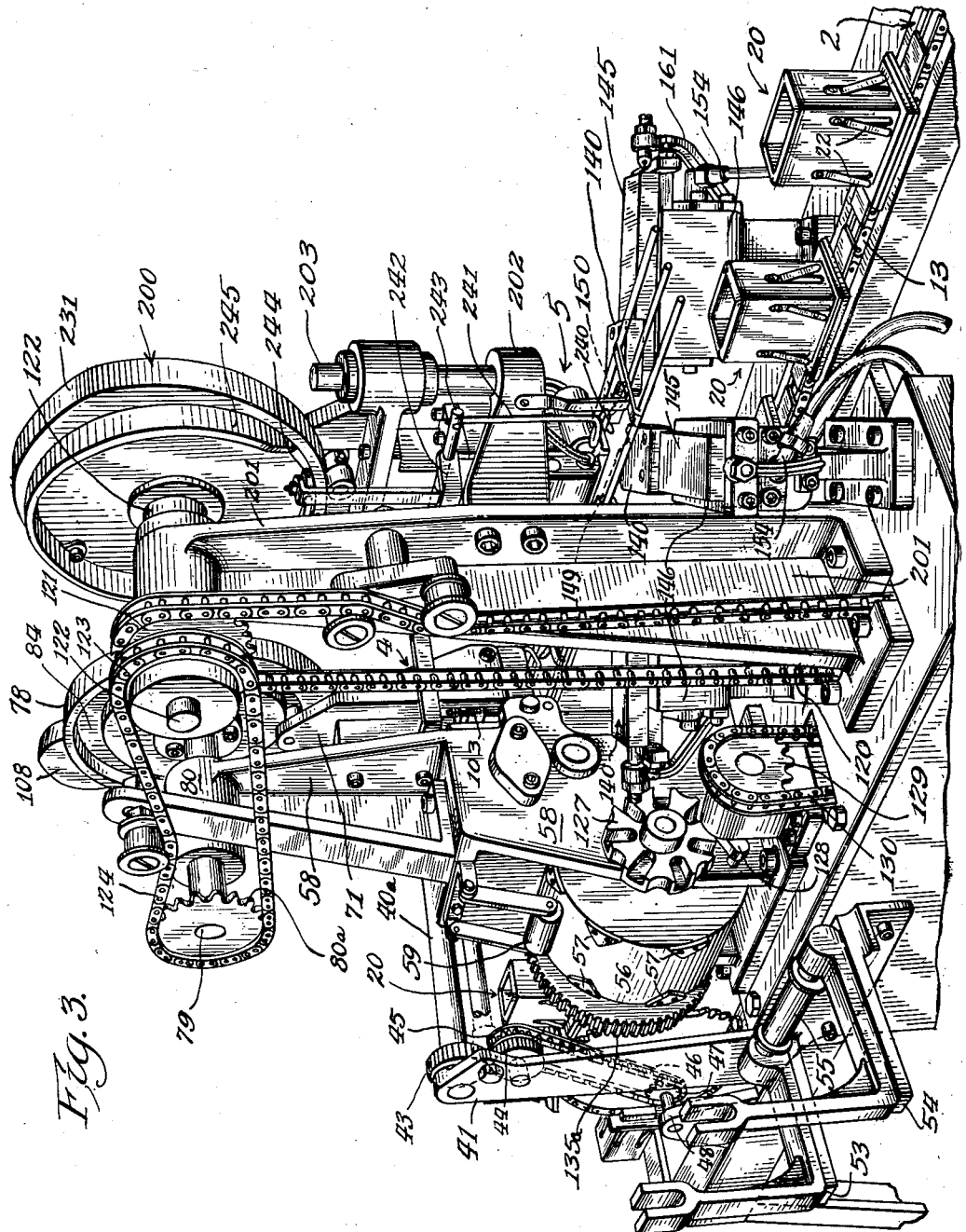

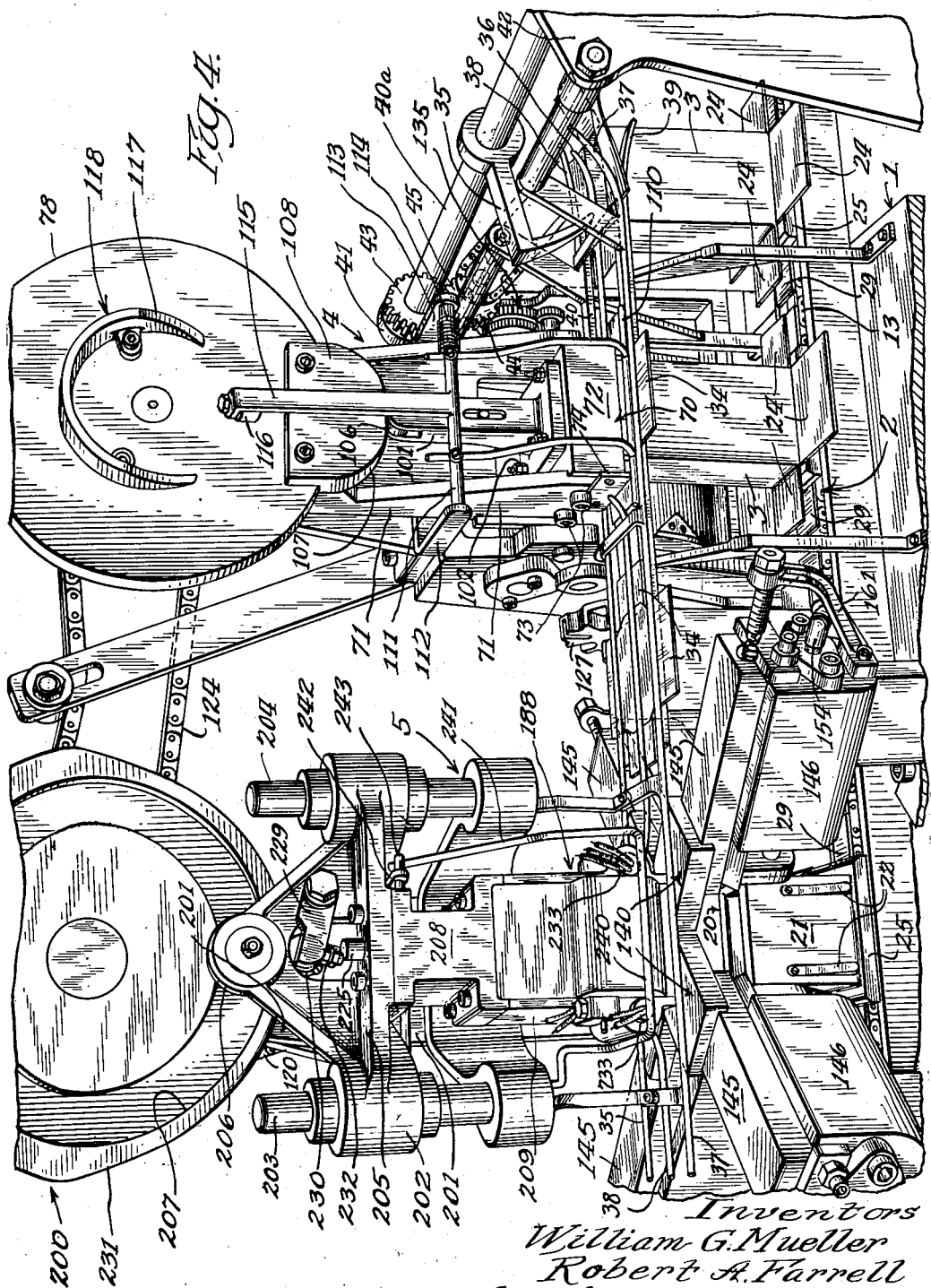

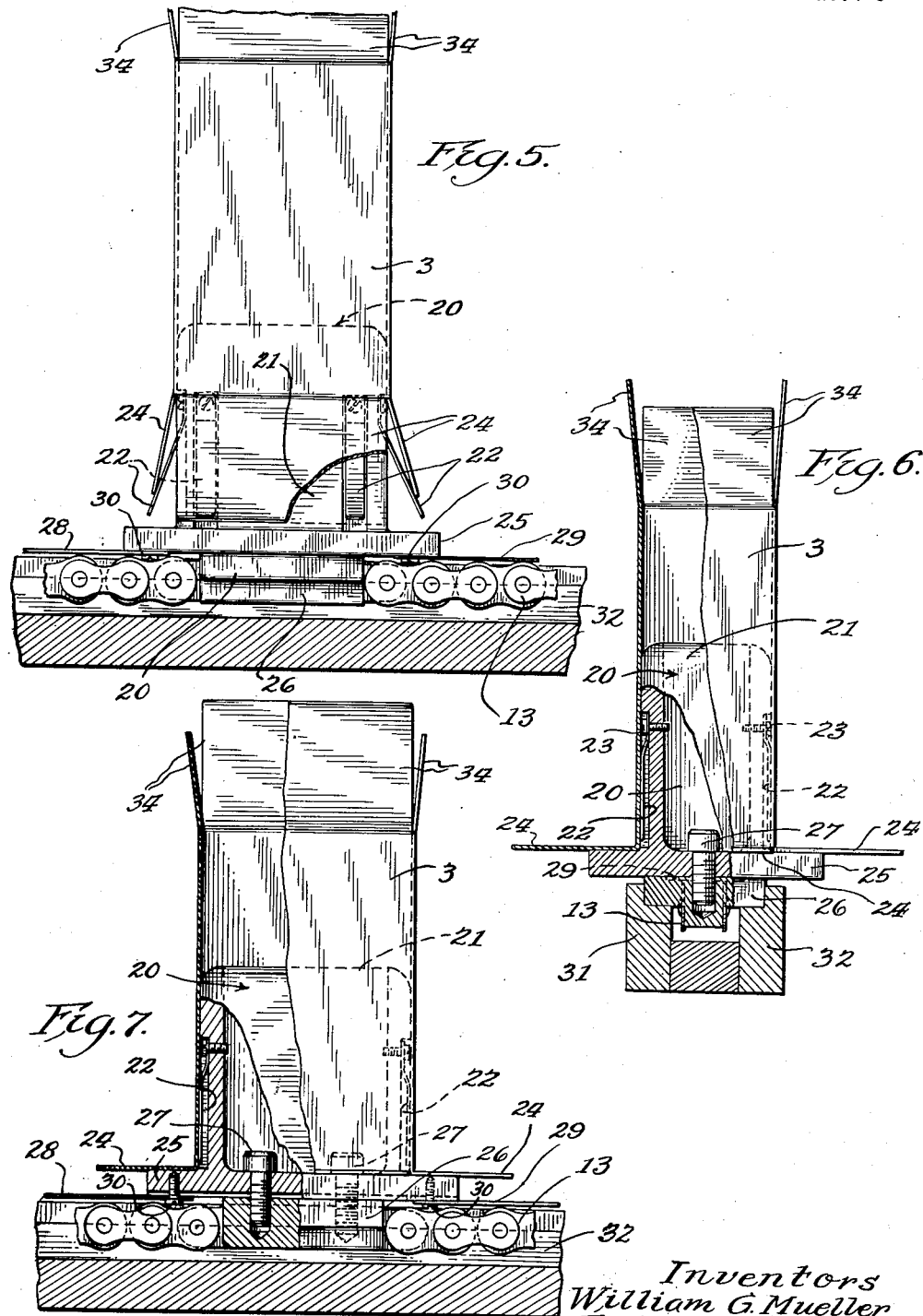

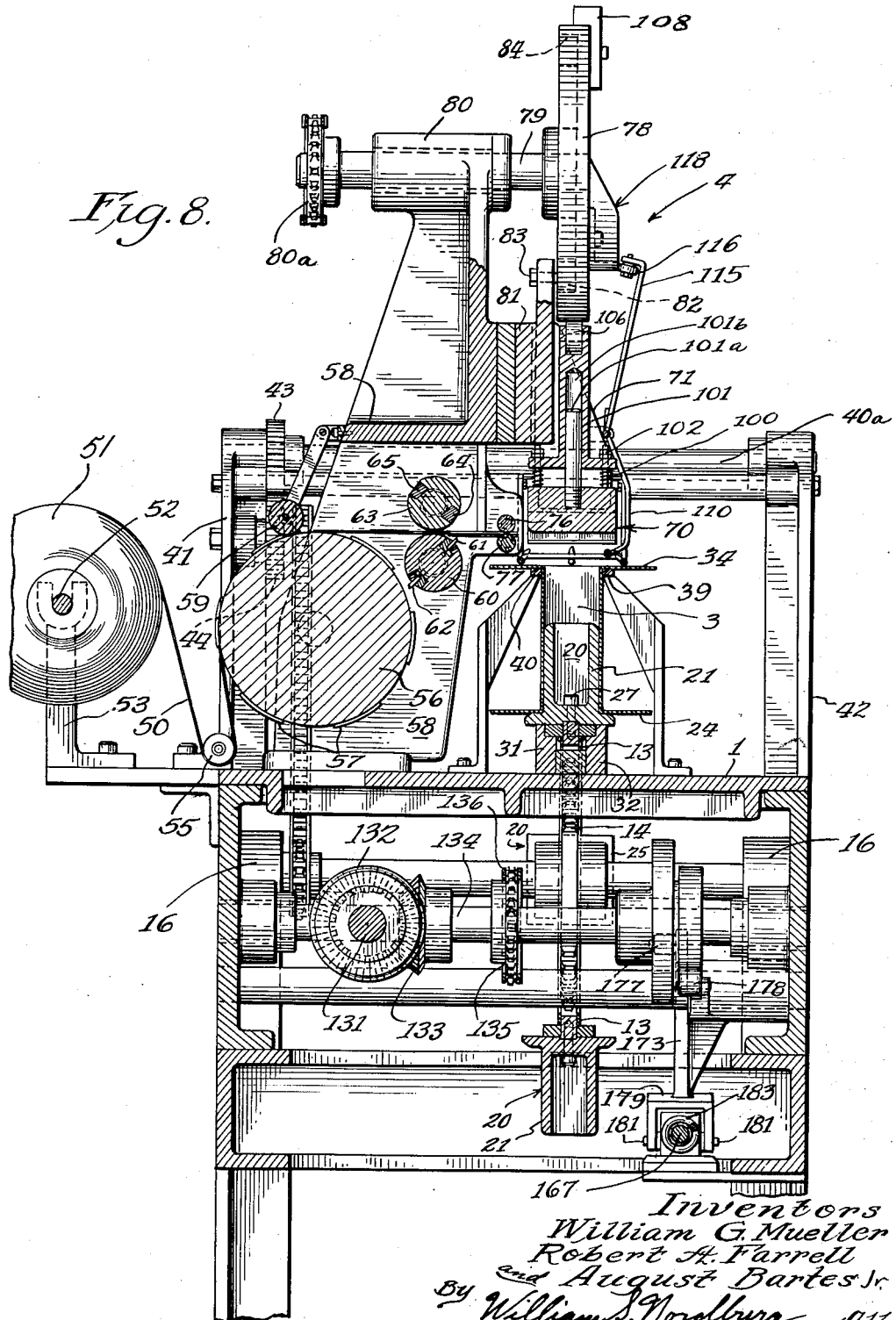

Oct. 28, 1952     R. A. FARRELL ET AL     2,615,377
APPARATUS FOR MAKING SEALED PACKAGES
Filed May 10, 1949     17 Sheets-Sheet 7
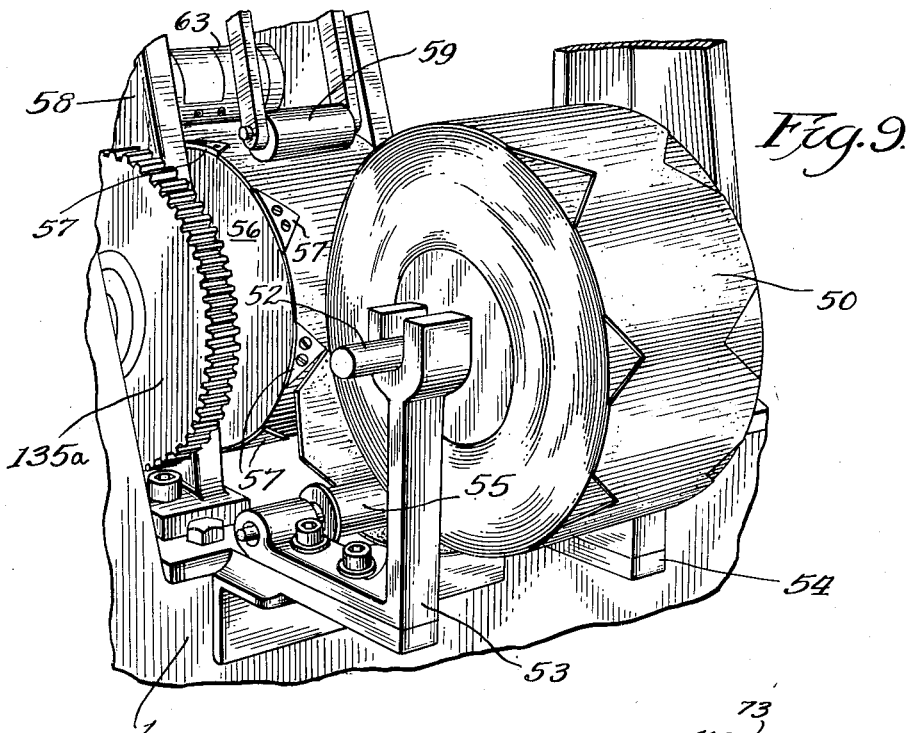
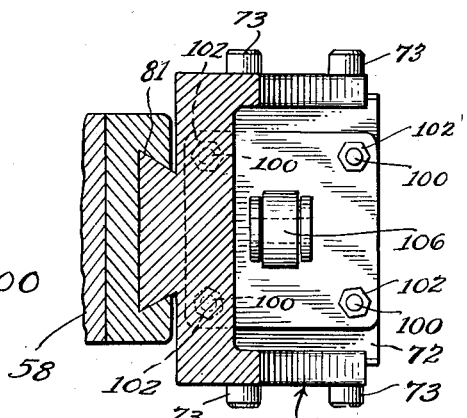
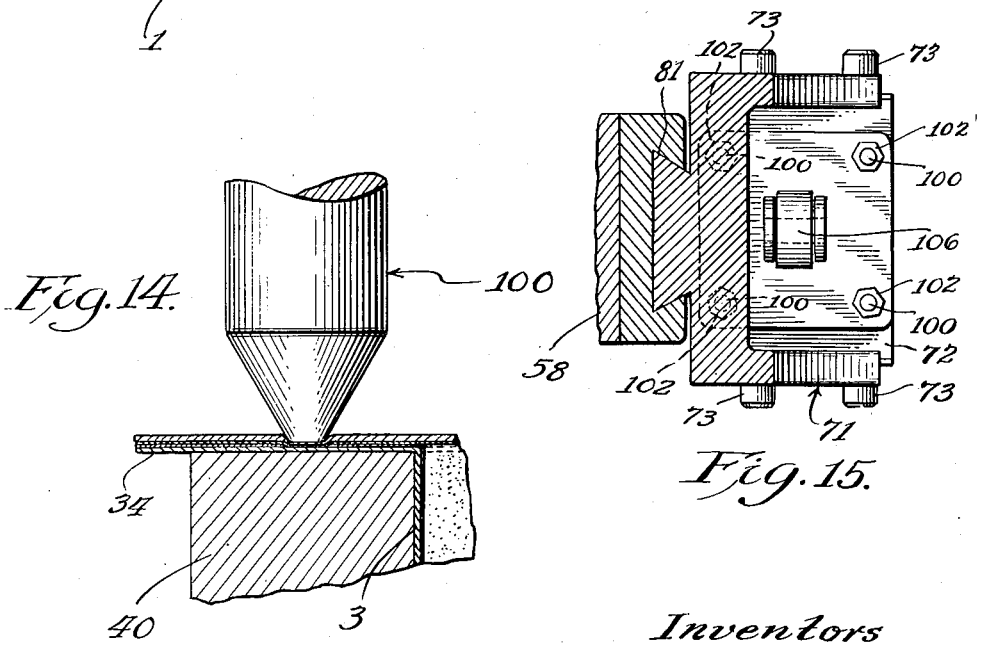
Inventors
William G. Mueller
Robert A. Farrell
and August Bartes Jr.
By William S. Nordburg
Atty.

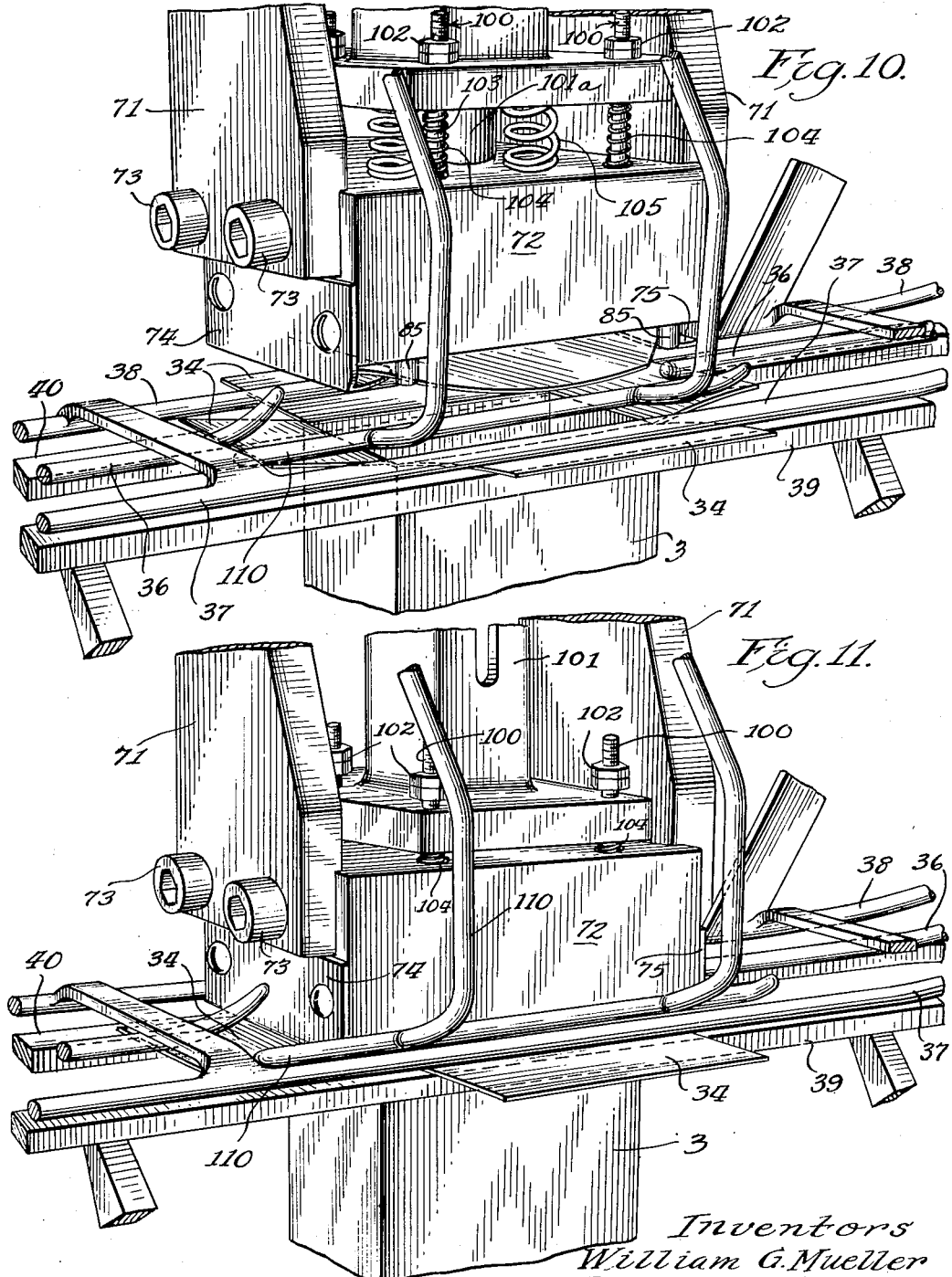

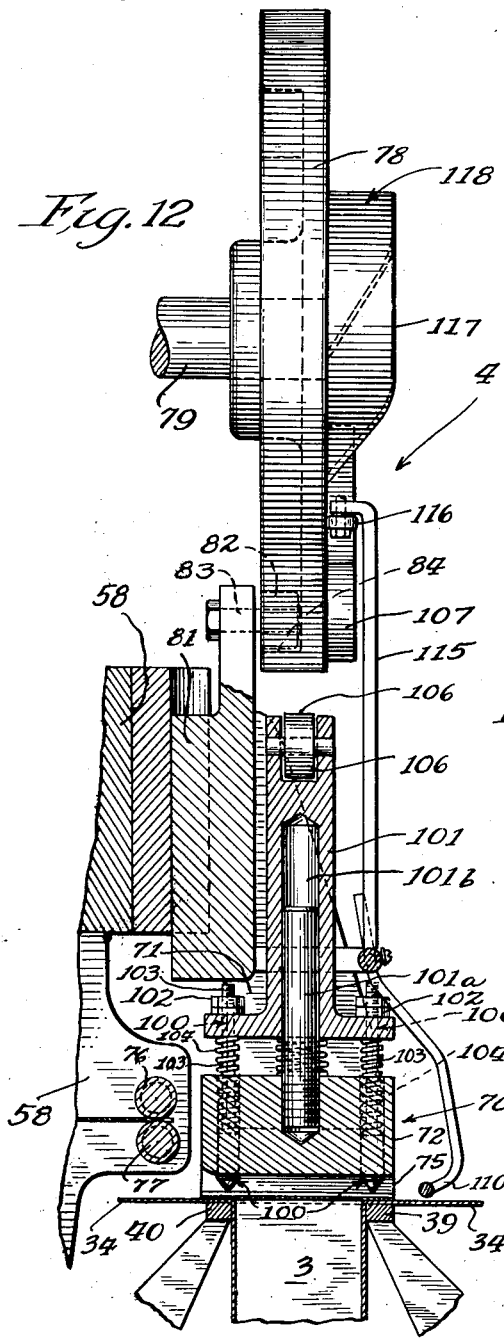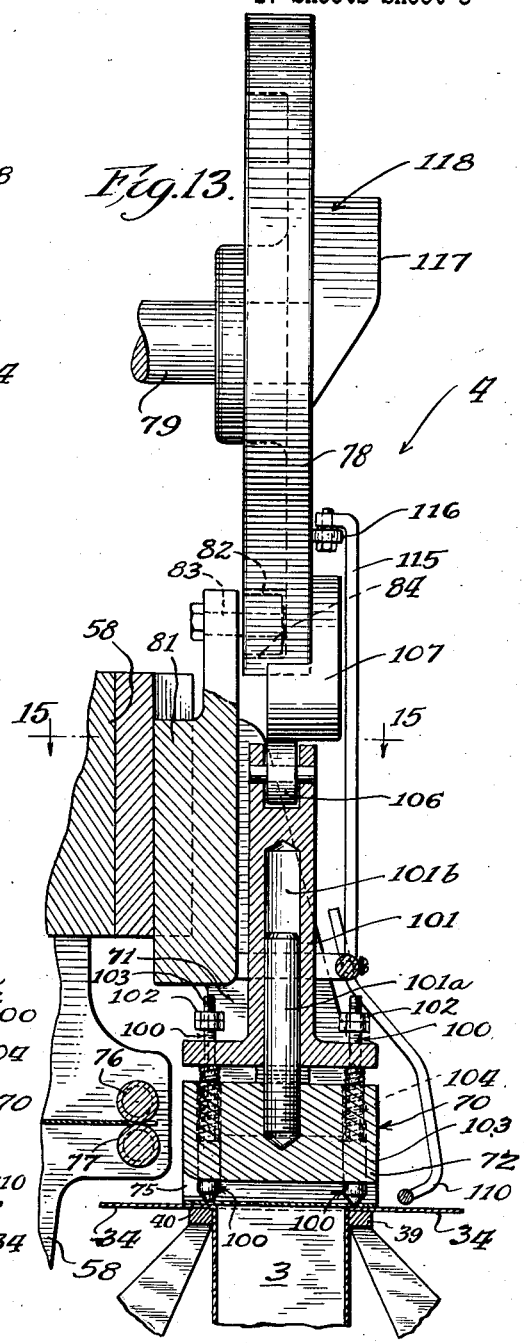

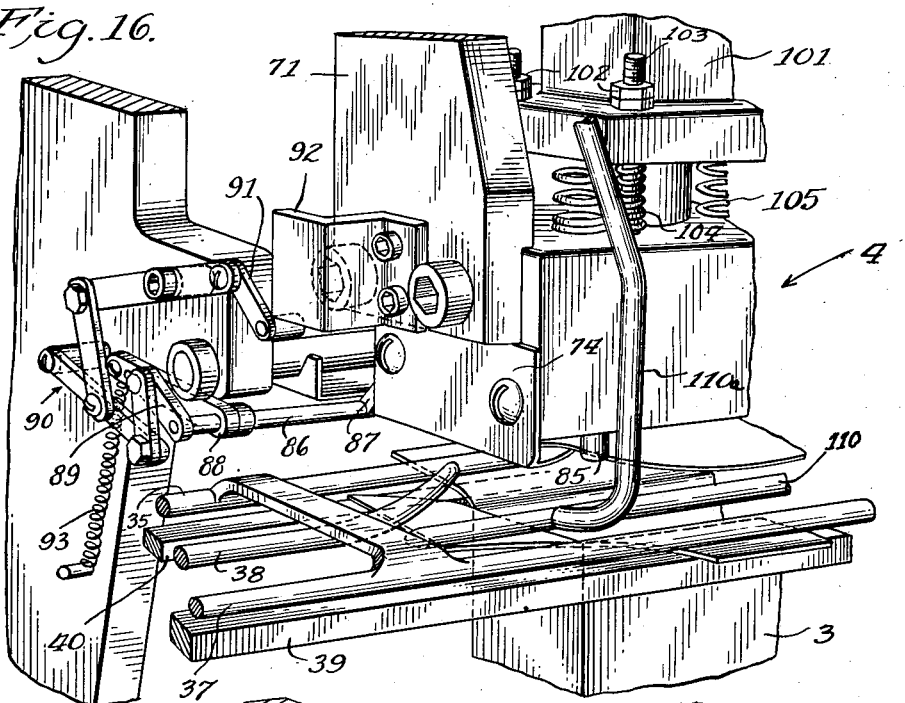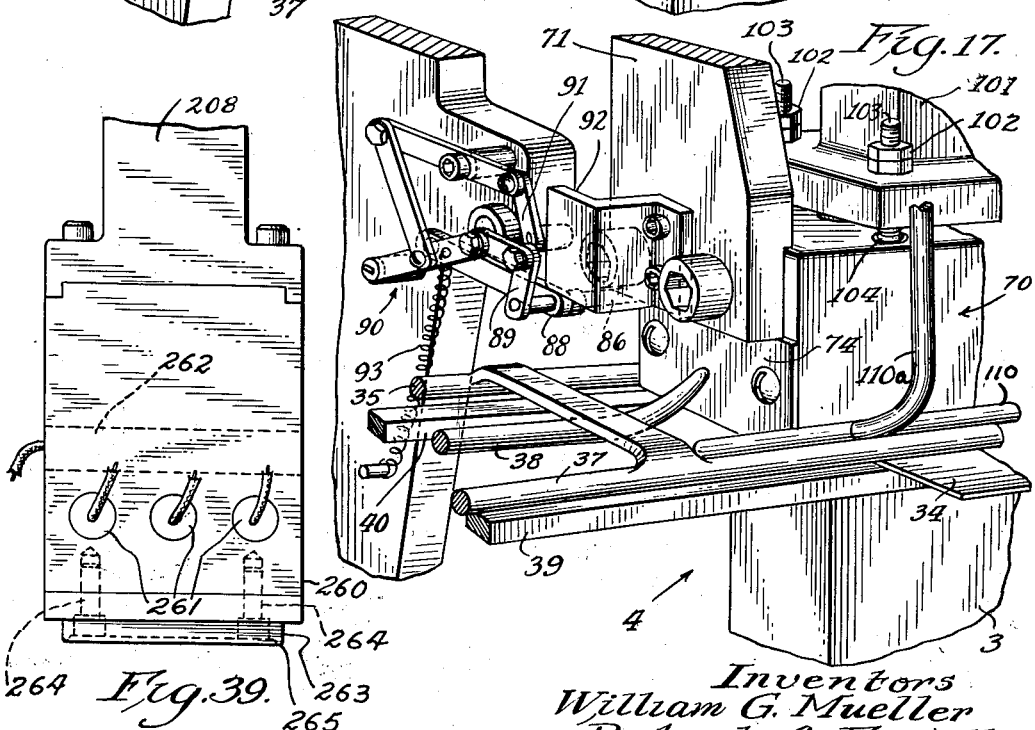

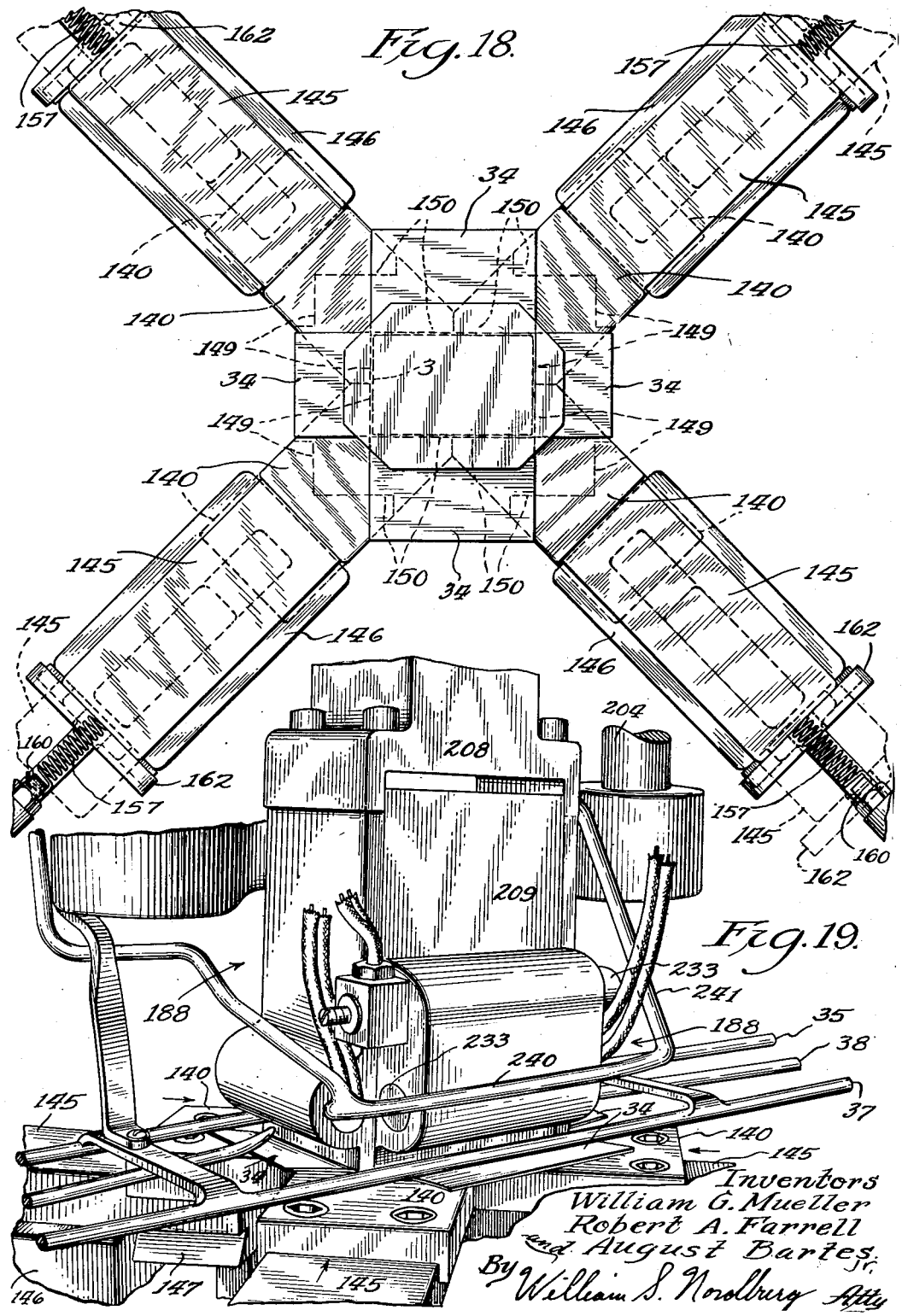

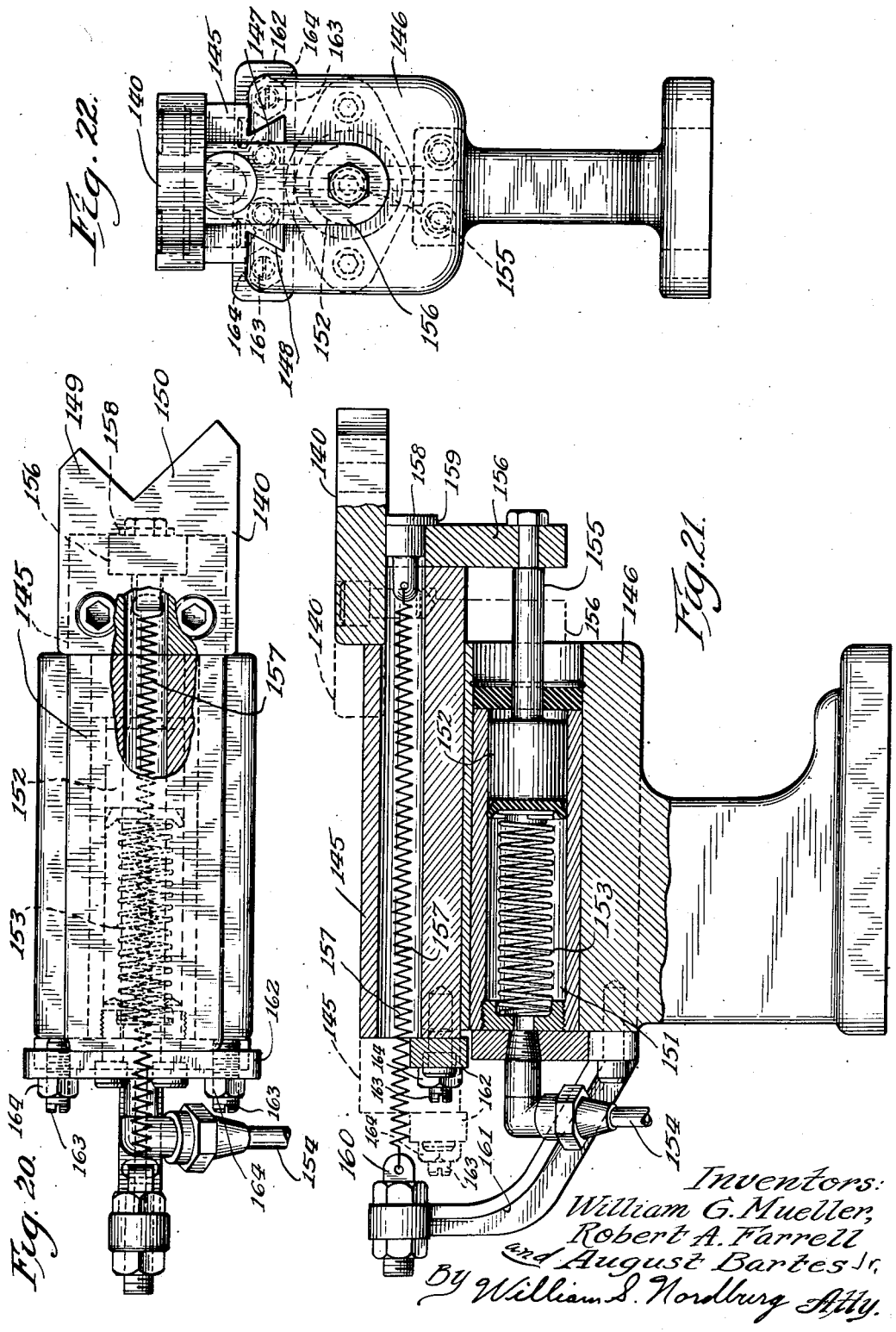

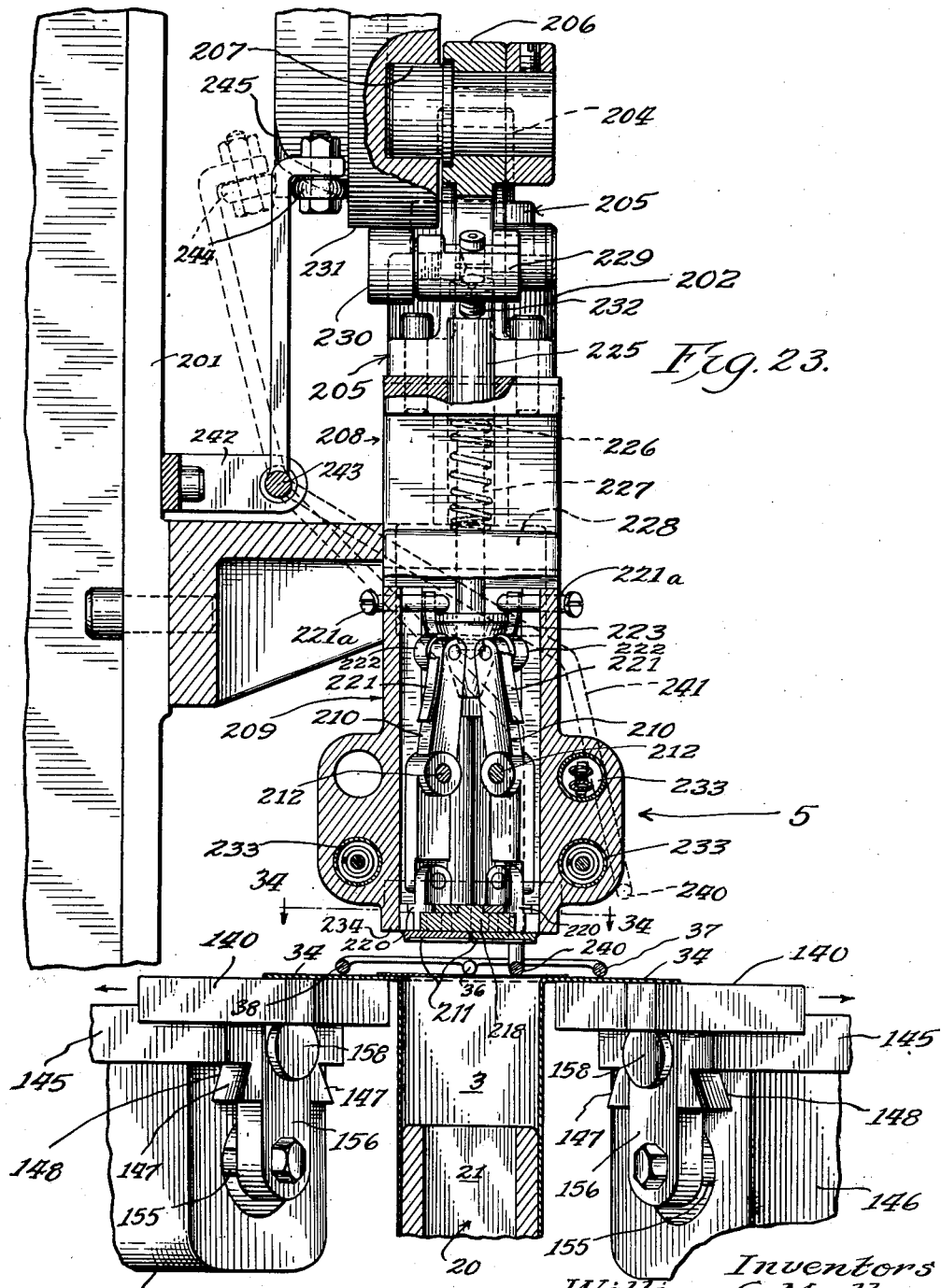

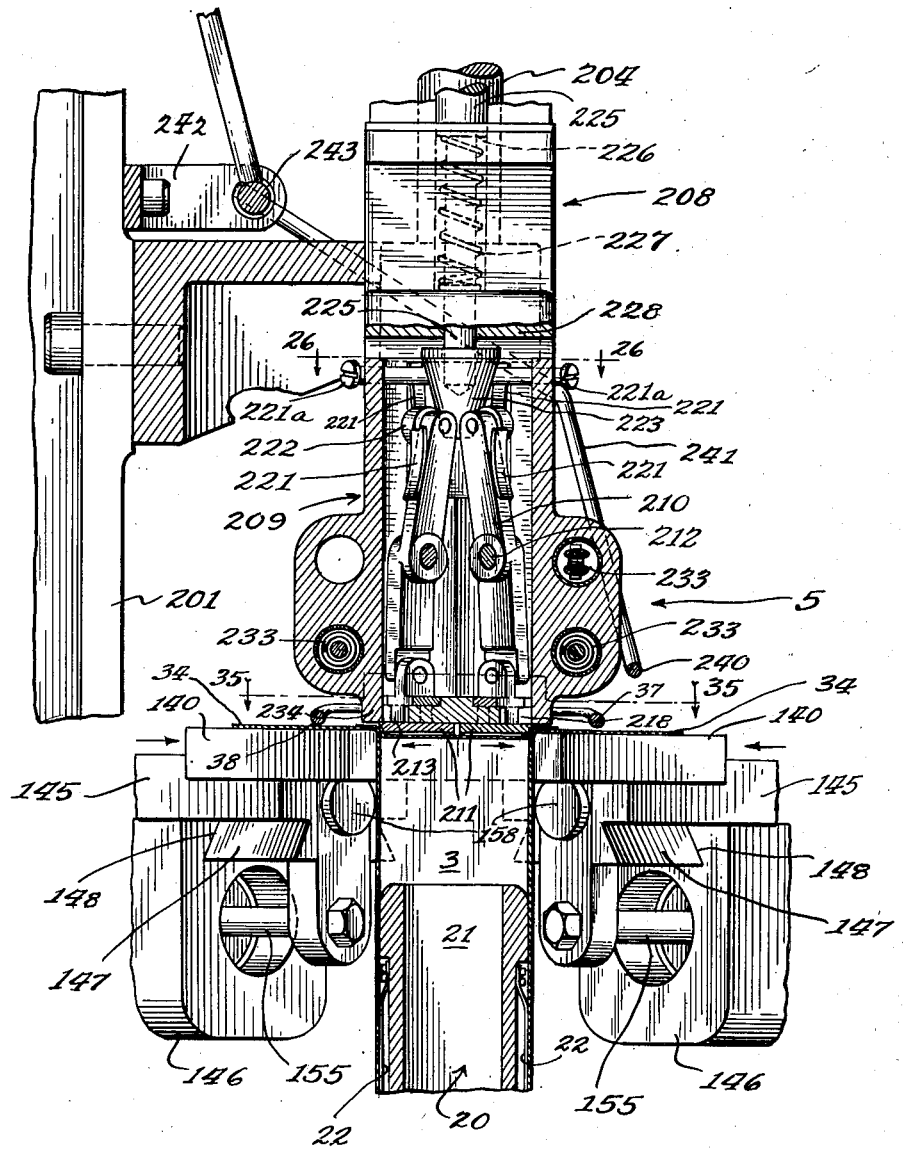

Oct. 28, 1952 R. A. FARRELL ET AL 2,615,377
APPARATUS FOR MAKING SEALED PACKAGES
Filed May 10, 1949 17 Sheets-Sheet 15
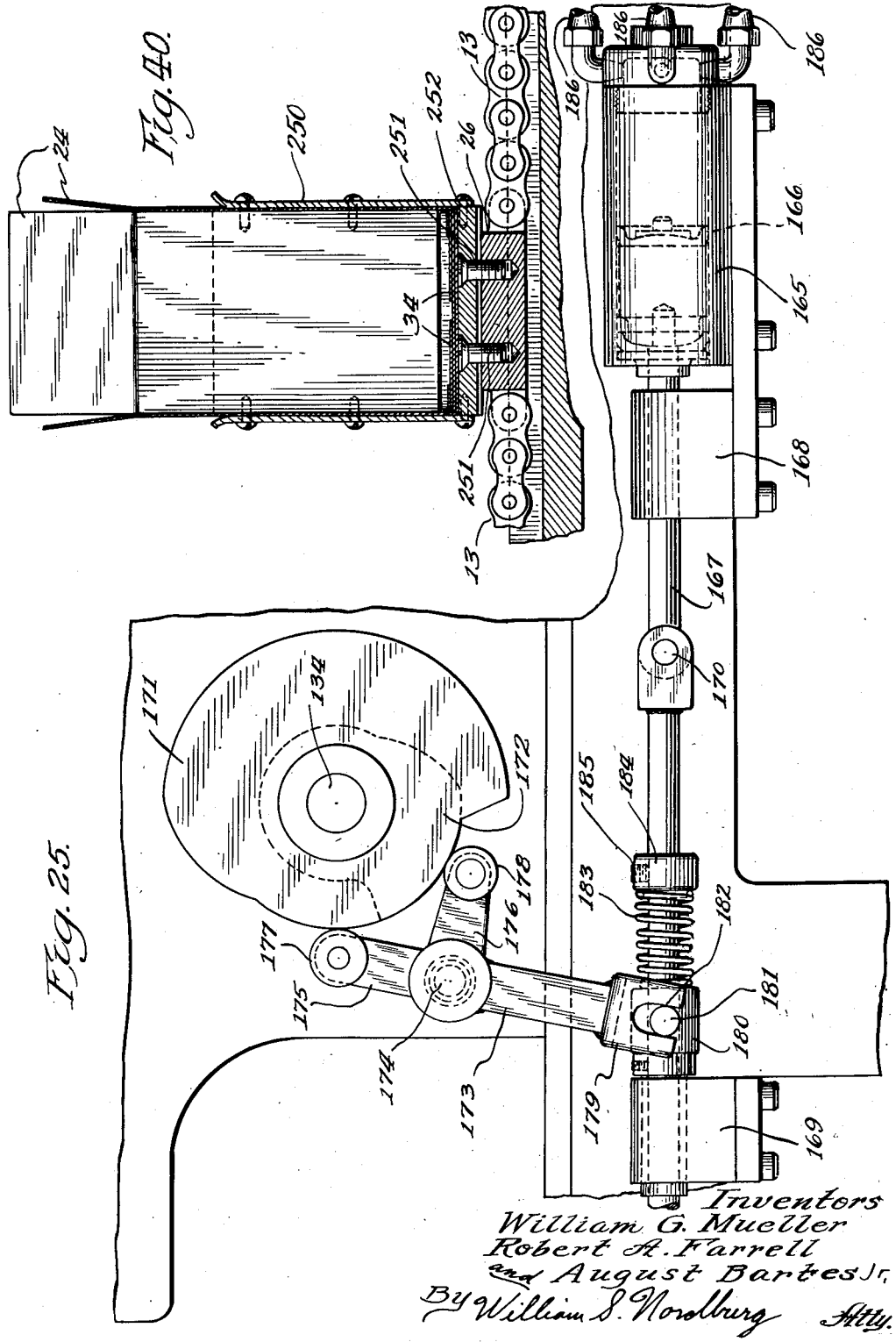
Inventors
William G. Mueller
Robert A. Farrell
and August Barbes Jr.
By William S. Nordburg Atty.

Oct. 28, 1952 R. A. FARRELL ET AL 2,615,377
APPARATUS FOR MAKING SEALED PACKAGES
Filed May 10, 1949 17 Sheets-Sheet 16

Inventors
William G. Mueller
Robert A. Farrell
and August Bartes, Jr.
By William S. Nordberg Atty.

Oct. 28, 1952 R. A. FARRELL ET AL 2,615,377
APPARATUS FOR MAKING SEALED PACKAGES
Filed May 10, 1949 17 Sheets-Sheet 17
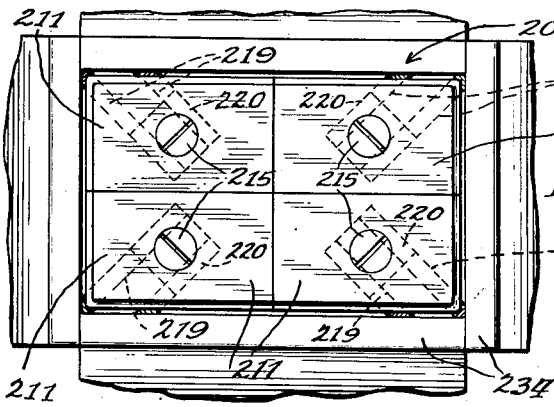
Fig. 32.
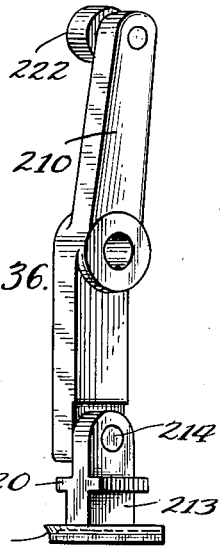
Fig. 36.
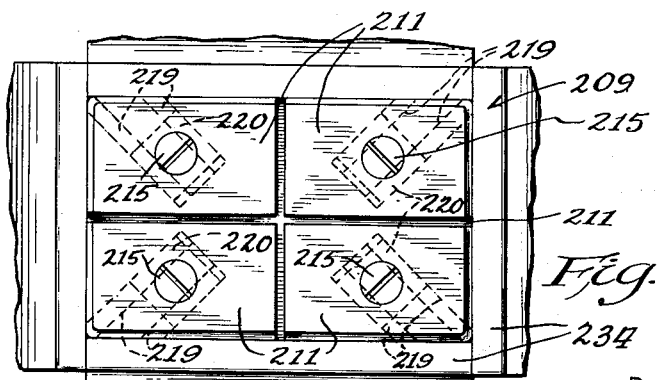
Fig. 33.
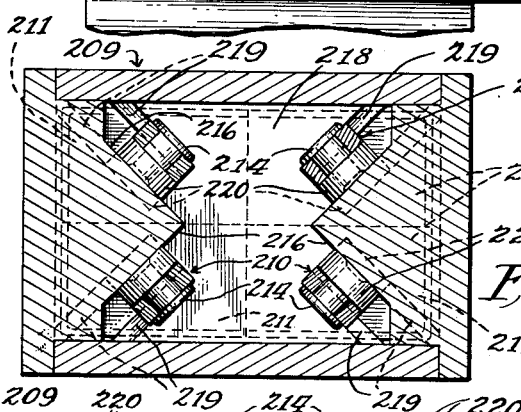
Fig. 34.
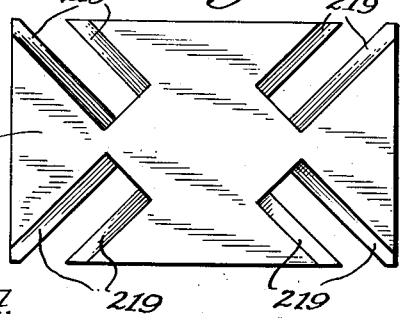
Fig. 37.
Fig. 38.
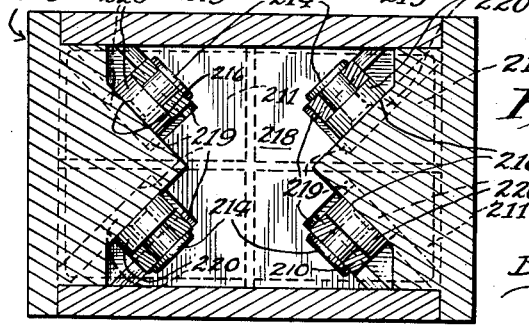
Fig. 35.
Inventor
William G. Mueller
Robert A. Farrell
and August Bartes Jr.
By William S. Nordberg Atty.

Patented Oct. 28, 1952

2,615,377

UNITED STATES PATENT OFFICE 2,615,377

APPARATUS FOR MAKING SEALED PACKAGES

Robert A. Farrell, Menasha, and William G. Mueller and August Bartes, Jr., Neenah, Wis., assignors to Marathon Corporation, Rothschild, Wis., a corporation of Wisconsin Application May 10, 1949, Serial No. 92,344

11 Claims. (Cl. 93—36.01)

This invention relates to an apparatus for making packages and more particularly to an apparatus for inserting and sealing flexible membranes in the ends of rectangular paper cartons and the like.

In the co-pending application Serial No. 686,537, filed July 26, 1946, of one of the inventors hereof, Robert A. Farrell, now U. S. Patent 2,496,043, dated January 31, 1950, there is disclosed a novel type of package wherein a flexible membrane, preferably made of flexible sheet material, such as paper coated with a heat sealable adhesive, is heat sealed to the inner wall surfaces as well as the end flaps at each end of a rectangular carton so as to render the carton leak-proof and dust-proof. In another pending application of two of the inventors hereof, Robert A. Farrell and William G. Mueller, Serial No. 761,968, filed July 18, 1947, now U. S. Patent 2,609,735, dated September 9, 1952, there is disclosed an apparatus for inserting and sealing membranes within the end of a carton and effecting a seal, preferably a heat seal.

The apparatus of this application is an improvement of the apparatus disclosed in the aforesaid co-pending application 761,968, and in addition provides means whereby membranes are automatically supplied from a roll of paper and located over the end of a carton in preparation for the insertion of the membrane and the heat sealing thereof to the inner walls of the carton. In a preferred embodiment of our improved apparatus rectangular cartons may be placed on an intermittent conveyer and carried by said conveyer to a first station where a membrane is located on an open end of the carton and temporarily secured or affixed in position. The membrane is supplied from a roll of paper and is cut to size by suitable cutting means and carried into position and secured to the carton by means of pressure elements. The conveyer then carries the carton with a membrane so located thereon to a second station where a sealing head inserts a portion of the membrane within the carton while simultaneously heating the membrane so as to effect a heat seal of the membrane to the inner walls of the carton. The sealing head performs a further function of heat sealing a portion of the membrane to the end flaps of the carton. Carton supporting and pressure means cooperate with the sealing head. After this operation is performed the conveyer then carries the carton with a membrane affixed therein to a discharge point.

In our apparatus the various mechanical steps are so arranged and timed with respect to each other that the operations at the first station and the second station can be carried on simultaneously thus effecting a high rate of production. Not only is this the first apparatus to carry out the various functions above described for the purpose of producing so-called end-sealed cartons at a commercially acceptable rate but also we have provided mechanism for improving the seal that is obtained.

Our improved apparatus will be better understood from the following description of a preferred embodiment and by reference to the attached drawings forming a part thereof and wherein like parts in each of the figures bear like numerals and wherein:

Figure 2 is a left front elevation.

Figure 3 is a partial rear perspective.

Figure 4 is a partial front perspective showing the first and second operating stations.

Figure 5 is a fragmentary view showing in front elevation a carton partly mounted on a conveyer.

Figure 6 is a fragmentary view in side elevation with parts broken away of a carton in position on the conveyer.

Figure 7 is a fragmentary view in front elevation with parts broken away of a carton mounted on the conveyer.

Figure 8 is a vertical section of our apparatus taken along the line 8—8 of Figure 1.

Figure 9 is a fragmentary view showing the membrane feed forming a part of the first station.

Figure 10 is a fragmentary perspective view showing the membrane placement head of the first station.

Figure 11 is similar to the view of Figure 10 showing the placement head in the position of temporarily affixing the membrane to the carton.

Figure 12 is a partial vertical section showing the pressure members of the sealing head in retracted position.

Figure 13 is a view similar to Figure 12 showing the pressure members in extended or operating position.

Figure 14 is a fragmentary view of the end of one of the pressure members in contact with the membrane.

Figure 15 is an enlarged fragmentary section taken along the line 15—15 of Figure 13.

Figure 16 is an enlarged fragmentary view of auxiliary mechanism for injecting membranes into position in the membrane placement head when the head is in up position.

Figure 17 is a view similar to Figure 16 with the placement head in down position.

Figure 18 is a fragmentary plan view of movable die members for supporting the carton at the second station.

Figure 19 is a fragmentary perspective of the sealing head at the second station in sealing position over a carton.

Figure 20 is a plan view of one of the movable die members with parts broken away.

Figure 21 is a side elevation of the die member of Figure 20 shown partially in section.

Figure 22 is a right side elevation of the movable die member in Figures 20 and 21.

Figure 23 is a fragmentary side elevation with parts broken away showing relative position of the sealing head and movable dies when the sealing head is in up position.

Figure 24 is a view similar to that in Figure 23 with the sealing head in down position.

Figure 25 is a fragmentary view showing hydraulic mechanism for operating the movable dies.

Figure 32 is a view of the expanding blade portions of the sealing head as viewed upwardly as from within the carton when the sealing head is in up position.

Figure 33 is similar to Figure 32 with the sealing head in down position.

Figure 34 is a fragmentary section of the sealing head taken generally along the line 34—34 of Figure 23.

Figure 35 is a similar view to that in Figure 34 and is taken along the line 35—35 of Figure 24.

Figure 36 is a fragmentary enlarged view of one of the link members in the sealing head.

Figure 37 is an enlarged plan view of a template forming a part of the sealing head.

Figure 38 is a side view of the template in Figure 37.

Figure 39 is a fragmentary side elevation showing a modified sealing head.

Figure 40 is a fragmentary view partially in section showing a modified carton support.

Figure 1:
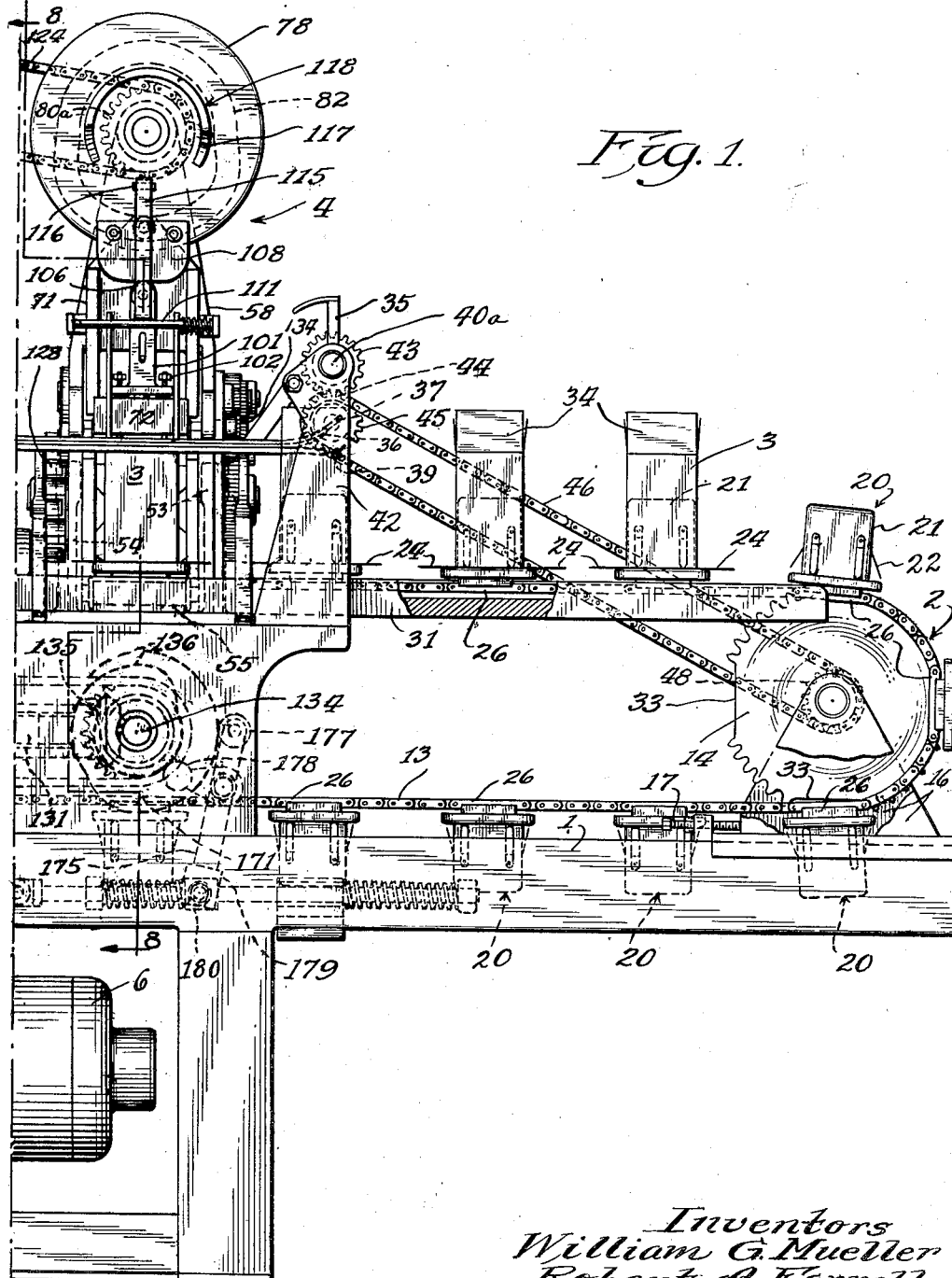
Figure 1 is a right front elevation.

Referring to Figures 1, 2, 3 and 4 it will be seen that our apparatus may comprise generally a table or frame 1 upon which is mounted an endless conveyer 2 which is suitably designed to carry cartons 3 to a first station 4 where individual membranes are positioned on the cartons and thence to a membrane sealing station 5 where the membranes are inserted and heat sealed in one end of the carton. The apparatus is all powered by a power source such as electric motor 6 connected to a suitable gear reduction drive 7. The drive is connected to a central drive shaft 8 through a chain drive 9. A hand wheel 9a is provided on the end of the drive shaft so as to obtain an optional manual drive of our apparatus. The central drive shaft 8 is driven continuously whereas the conveyer system 2 operates intermittently. This is accomplished through a Geneva drive 10 which is in turn connected to one of the sprockets 11 of the conveyer through a suitable coupling, such as chain or belt 12. The Geneva drive 10 is of the conventional type having crank 13' fixed to drive shaft 8.

Conveyer 2 may be of any suitable form but preferably comprises an endless chain 13 carried by sprockets 11 and 14 which are suitably mounted on the table or frame 1 by brackets 15 and 16. Bracket 16 is slidably mounted on the table so that the tension on the chain may be adjusted by the adjustment screw 17.

The cartons 3 are carried by the conveyer by means of carriages 20. The carriages 20 (see Figures 5, 6 and 7) include a mandril portion 21 over which a squared up carton can be placed by hand or by suitable carton set-up mechanism (not shown). The carton is held on the mandril through the frictional engagement of spring fingers 22 which are secured at their upper end to the mandril by screws 23. The spring fingers 22 serve an additional function and that is of guiding the flaps 24 of the carton outwardly so that when the carton is in position they rest extended against the base of the mandril 25.

The mandril portion of the carriage is secured to an elongated link 26 forming a part of the chain 13 by screws 27. Protecting plates 28 and 29 are secured to the base 25 by screws 30 which plates prevent the carton from coming into contact with the chain. Rail members 31 and 32 which extend along side of the chain 13 on the upper side of the conveyer provide tracks for the link member 26 and thus serve to support the carriages as they move from one end of the apparatus to the other. The sprocket wheels 11 and 14 have suitably spaced gaps 33 to accommodate the long links upon which the carriages are supported.

After a carton has been positioned on a carriage it is carried forward by the conveyer 2 to the first station 4. In the course of travel to the station 4 the upper flaps 34 of the carton 3 are folded outwardly in all directions so as to expose an open end of the carton for placement of the membrane. The mechanism for folding the upper flaps is similar to that employed in packaging equipment. A revolving kicker 35 engages the front flap of the carton and forces it beneath the leading end of a guide rail 36. Parallel with guide rail 36 are two other guide rails 37 and 38 which are so shaped so as to engage the side flaps of the carton to cause them to fold outwardly. The guide rail 36 engages the rear flap and the progressive movement of the carton causes it to be folded downwardly. Beneath the guide rails 36, 37 and 38 are a pair of supporting rails 39 and 40 which serve to hold the upper part of the carton in position and aid in maintaining the side flaps in an outwardly extended position.

The kicker 35 is fixed to a shaft 40a which in turn is journaled in brackets 41 and 42 mounted on the table. The shaft 40a is rotated by a spur gear 43 fixed to the shaft which in turn is engaged by a second spur gear 44 pivotably mounted on bracket 41. Gear 44 is driven by a sprocket 45, which is keyed to it, chain 46 and sprocket 47 keyed to shaft 48 which is the shaft to which conveyer sprocket 14 is also keyed. Thus the kicker moves intermittently in time and relation to the conveyer.

The carton with its top flaps extended outwardly moves into position at station 4 and remains there while the membrane is positioned and press sealed to the carton.

The membrane feeding station 4 comprises a strip of membranes 50 (see Figures 8 and 9) wound on a spindle 52 in the form of a roll 51 which in turn is journaled and supported on brackets 53 and 54 which in turn are bolted to a table 1. The paper has been die cut and coated so as to present a plurality of octagonal shaped heat sealable membranes. The strip passes from the roll down beneath a guide roll 55 which is also journaled in the brackets 53 and 54 and passes upwardly into engagement with a rotating drum 56 which serves as a feed drum for the paper strip. The drum 56 is provided with spaced lugs 57 which correspond to the cut out portions of the paper strip and hence provide driving lugs which prevent slipping of the paper on the feed roll. The feed roll is journaled in a frame member 58 which is bolted to the table or frame 1. A smoothing roll 59 hinged to the frame 58 serves to keep the paper on the roll 56 so that it will be moved forward by rotation of the roll. The strip of membranes 50 passes from the roll 56 through a rotary cutter comprising a bottom roll 60 having a pair of knives 61 and 62 radially mounted therein which cooperates with an anvil roll 63 having inserts 64 and 65 which cooperate with the knives to cut the paper ribbon at the junction of each of the octagonal shaped membranes. A membrane that has been severed by the cutter is ready for introduction into the membrane placement head 70 when said head is in proper position.

The placement head 70 (see Figures 10, 11, 12 and 13) includes a channel member 71 at the base of which is secured a block 72 secured to the channel member by screws 73. Depending from each edge of the block 72 are a pair of sheet metal holders 74 and 75 which are adapted to receive the membrane from feeding rolls 76 and 77 during the course of travel of the placement head 70 in a vertical reciprocating motion. This reciprocating motion is imparted to the placement head by means of a rotary cam 78 mounted on an axle 79 which is journaled in a bearing 80 supported by the frame member 58. The channel member 71 is slidably secured to the frame 58 by slide 81 (see Figure 15). At the upper end of the channel member is a cam roller 82 secured by a bolt 83 which cam roller rides on an internal cam surface 84 of the cam 78. Rotation of the cam 78 through shaft 79 and driving sprocket 80a will cause the channel 71 and hence the block 72 to rise and fall according to the shape of the cam.

When the block 72 is in its lower-most position, as shown more particularly in Figure 12, a membrane carried on holders 74 and 75 is in position directly over the opening of the carton. The membrane is cut larger than the opening of the carton so that a portion of it overlies each of the flaps and it is so positioned that the diagonals of the membrane lie adjacent each of the corners of the carton.

In a modification of our preferred embodiment the membrane is properly positioned within the cavity formed by the holders 74 and 75 by means of an auxiliary feeding means (see Figures 16 and 17). The auxiliary feeding means is adapted to take a free membrane from the feed roll 76 and 77, which in many cases are adequate, and move or kick it into the cavity where its forward-most motion is limited by stops 85 extending downward from the block 72.

The auxiliary feed mechanism comprises a rotating rod 86 located immediately beyond the rolls 76 and 77. The bar preferably includes lugs 87 which are adapted upon rotation of the bar to engage the membrane leaving the feed rolls and move it into the cavity. The rod 86 is supported by brackets 88, (only one shown) secured to the frame 58 and is oscillated by a crank 89 which is connected through a linkage 90 to a cam follower 91. A bracket 92 mounted on the channel member 71 strikes the cam follower 91 in its downward motion causing it to swing inwardly, as shown in Figure 16, so as to cause rotation of the rod 86. The spring 93 connected to the linkage 90 serves to restore the position of rod 86 and lugs 87 when the placement head is moved upwardly out of contact with the follower 91.

After the membrane has been placed by the placement head it is necessary to temporarily affix the membrane so that it will remain in position when moving to the second station 5. To accomplish this four pressure pins 100 are provided which are slidably mounted in holes at each corner of the block 72. The upper end of these pins pass through a cam follower bracket 101 and are provided with adjusting nuts 102 which limit the downward movement of the pins. The pins have a reduced diameter portion 103 about which are coil springs 104 which are adapted to urge the pins downwardly with respect to the cam follower bracket 101. Other coil springs 105 serve to urge the bracket 101 and the block 72 apart.

Rotatably mounted at the top of the cam bracket 101 is a cam follower 106 which moves downwardly under pressure from cam surface 107 formed on a lug 108 secured to the cam 78. Downward movement of the follower 106 and hence of bracket 101 exerts a pressure against the coil springs 105 which in turn urges the pins 100 downwardly and into contact with the membrane carried in the cavity of the head 72. Continued downward movement of the bracket 101 results in a resilient pressure seal caused by the pins 100 under pressure of springs 104 in cooperation with supporting rails 39 and 40 as more clearly shown in Figure 14.

In order to obtain clearance for the membrane placement head it is necessary to interrupt guide rail 36 which it will be remembered serves to hold the front and rear flaps down as the carton moves through the apparatus. To retain the flaps down therefore when the carton moves into position at station 4 an auxiliary rail 110 is provided. Rail 110 is carried on arms 110a which is secured to a shaft 111 pivotally mounted on brackets 112 and 113. A spring 114 on the shaft 111 normally urges the auxiliary rail 110 outwardly so as to provide clearance for the placement head when in its lower-most position. In order to swing the auxiliary rail inwardly so as to be effective in holding down the front and rear flaps of the carton when the placement head is in up position there is provided on shaft 111 an upwardly extending arm 115 at the end of which is a cam follower roller 116. Roller 116 is adapted to be engaged by a cam surface 117 formed on an upstanding flange 118 secured to cam 78. The position of the auxiliary rail in its inner and outer position is clearly shown in Figures 10 and 11.

Alignment of block 72 and cam follower bracket 101 is secured by a stud 101a slidably contained within a cylindrical chamber 101b of the bracket 101.

The various members of the membrane placement head all move in timed relation and are driven by conventional means from the main drive shaft 8. For example chain 120 which engages a sprocket on the main drive shaft 8 drives through a sprocket 121 on shaft 122. On this shaft is another sprocket 123 over which passes a chain 124 which serves to drive sprocket 80a connected with cam 78 through shaft 79. The paper feed roll 56 is driven intermittently by a conventional Geneva drive 127. The crank member 128 of this drive is driven by a sprocket 129 through a chain 130 which in turn is connected to another drive shaft 131 which in turn is driven through bevel gears 132 and 133 by a secondary drive shaft 134. This shaft in turn is driven by the main drive shaft 8 through sprocket 135 and chain 136. The Geneva drive permits the presentation of one cut membrane to the placement head in every complete cycle of cam 78. The rotating cutter rolls 60 and 63 as well as feed rolls 76 and 77 are driven through suitable gearing including a ring gear 135a fixed to the feed roll 76 so that its motion is also intermittent.

After the membrane has been placed in the carton and temporarily secured to the carton by the pressure pins 100, the conveyer moves the carton forward to the membrane sealing station 5. When in this position the carton is supported on all four sides immediately beneath the flaps thereof by four movable die members 140. Each of the die members is identical and reference is made to Figures 21 and 22 for the construction of the same. A sliding die block 145 is slidably mounted on a housing 146 for sliding motion inwardly and outwardly with respect to a carton positioned at the second station. This mounting comprises a wedge shaped tongue 147 operating in a correspondingly shaped groove 148 in the top of the housing. The die members 140 have carton engaging surfaces 149 and 150 positioned at substantially right angles and of such dimensions that in cooperation with each other substantially the entire periphery of the carton is supported (see Figure 18) when the die blocks 145 are in their innermost position.

Movement of the die blocks is accomplished in one direction by the action of a cylinder 151 and a piston 152 which piston is urged in one direction by spring 153. A fluid, preferably a liquid such as oil but air could be used, is introduced into the cylinder through inlet 154 under sufficient pressure to move the piston 152 forward. On the end of the piston is a connecting rod 155 which is secured to a downwardly extending arm 156 forming a part of the die block 145. Hence, movement of the piston moves the die block inwardly. To effect return of the die block upon release of the pressure of the fluid in inlet 154 there is provided a spring 157 which is secured to a plug 158 secured against lateral movement at the inner end of the die block 145 by a flange 159 which cooperates with the shoulder of the die block. The outer end of the spring is secured to an adjusting screw 160 suitably mounted in a bracket 161 forming a part of the housing 146. The innermost position of the die block 145 is determined by a stop bar 162 which is adjustably mounted on the rear of die block 145 by a pair of screws 163. The bar 162 abuts the upper edge of housing 146 to thus limit the stroke of the die block 145. By setting nuts 164 on the adjusting screws the stroke may be adjusted to compensate for cartons of different thickness.

The fluid under pressure is supplied through an inlet 154 from a master cylinder 165 (Figures 2 and 25) which is mounted on the frame or table 1 immediately above the motor drive. The master cylinder comprises the piston 166 mounted on the end of a piston rod 167 which is slidably supported in brackets 168 and 169 secured to the frame member. The piston rod is preferably in two parts joined together by a swivel 170 in order to insure against binding in bracket 168.

The piston rod is driven through a pair of cams 171 and 172 which are mounted on shaft 134. The cams actuate crank 173 which is pivotally mounted on the frame by a pin 174 through cam follower arms 175 and 176. Rollers 177 and 178 are secured at the ends of the arms for engaging the cam surfaces. The crank 173 is connected to the piston rod by a sliding connection comprising yoke 179 which fits over a collar 180 slidably mounted on the piston rod and keyed against rotation thereon. The collar has a pair of lugs 181 (only one shown) which are adapted to slide within a slot 182 in each of the arms of the yoke 179. Movement of the collar 180 by the crank 173 compresses a spring 183 which in turn acts against a second collar 184 which is fixed to the piston by a set screw 185. The spring serves as a safety device in the event there is a binding of excessive fluid within the piston or the die members. The cam follower 175 cooperating with cam 171 moves the piston forward and forces the fluid therein to the die members in timed relation with the movement of the conveyer so as to provide clearance for the carton when moving to its position at the sealing station 5 and then to provide movement of the slide blocks 145 inwardly so as to provide a support for the carton prior to the sealing of the membrane. The fluid leaves the master cylinder through outlets 186 which are connected by tubing to inlets 154 of the die members.

The cam follower 176 cooperates with cam 172 to return the piston 166 to its rearmost position whereby a positive reduction of pressure in the master cylinder causes the slide blocks 145 to be returned not only by the action of springs 153 and 157 but by the action of the vacuum created in cylinders 151. By this arrangement applicants obtain precise movement of the die members essential to high speed operation of their apparatus.

After the carton and membrane have been positioned beneath a sealing head 188 at the sealing station and the die members have moved forward to support the carton, the sealing head moves downwardly under control of a master cam 200 to insert the membrane within the carton and effect the seal of the membrane to the inner walls of the cartons as well as to the flaps. The sealing head 188 is supported above the frame 1 by a bracket 201 at the top of which is journaled shaft 122 to the end of which is fixed the master cam 200. As previously described shaft 122 is driven by sprocket 121 which in turn is driven through chain drive 120 by the master drive shaft 8. Also fixed to the bracket 201 is a yoke 202. On each end of the yoke are vertical guide posts 203 and 204.

Figure 26:
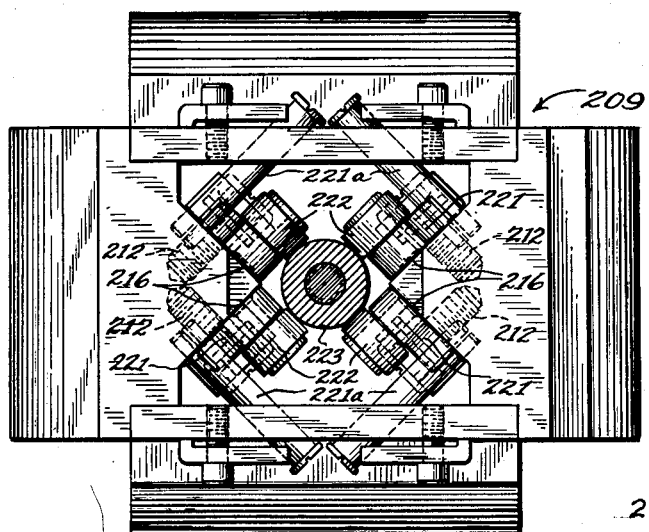
Figure 26 is a fragmentary section of the sealing head taken generally along the line 26—26 of Figure 24.
Figure 30:
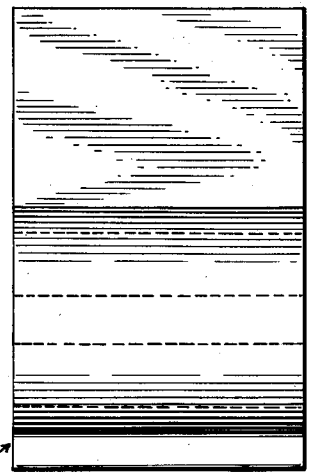
Figure 30 is a fragmentary side elevation of a portion of the sealing head.
Figure 27:
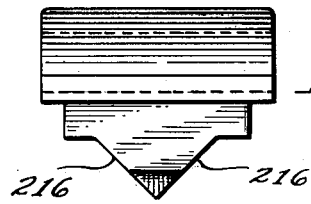
Figure 27 is a plan view of one part of the sealing head.
Figure 31:
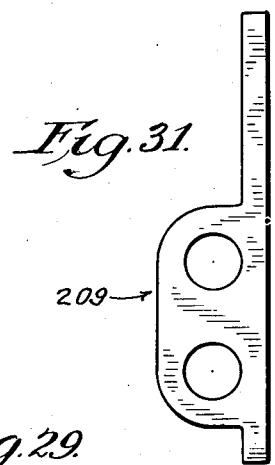
Figure 31 is an end view of the part in Figure 30.
Figure 28:
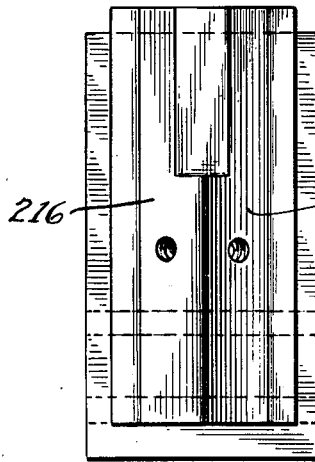
Figure 28 is a front elevation of the part in Figure 27.
Figure 29:
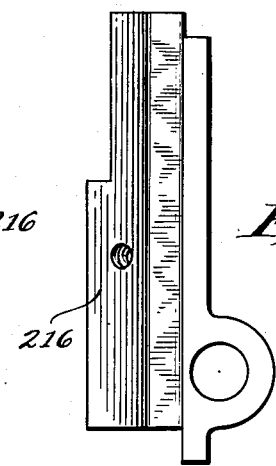
Figure 29 is a side elevation of the part in Figure 27.

Slidably mounted on the posts 203 and 204 is a cross member 205. A lug 206 having a suitable cam follower thereon is secured to the cross member and extends into and is adapted to ride on cam surface 207 which is cut into the master cam 200. In this way the cross member 205 will reciprocate vertically on posts 203 and 204 depending upon the shape of the cam 207. The cross member 205 carries an I shaped housing 208 to which is secured a second housing 209 which housings comprise the sealing head. Within the housings 208 and 209 are a plurality of links 210 (see Figures 23, 24 and 26) which carry a plurality of blades 211. The links are pivotally secured to the inner walls of the housing 209 by suitable screws 212 whereby a rocking action of the links 210 will effect an inner or outer movement of the blades 211.

The blades are secured to the links 210 by lugs 213 which are mounted on pivots 214 at the end of the links. The blades are secured to the lugs 213 by suitable screws 215. The links 210 are so mounted within the housing 209 that the blades move substantially diagonally with respect to each other. In this way the maximum pressure or seal of the membrane to the cartons can be obtained in the corners which is the critical area.

To accomplish this diagonal movement the inner walls of the housing 209 are formed as angular surfaces 216 and the links 210 are mounted on these angular surfaces. This angular movement is further accomplished by means of a template 218 which has a plurality of guide ways 210 cut therein. This template is set into the base of housing 209 and the lugs 213 are adapted to pass through and ride in the guide ways 219. A flange 220 is provided on the lugs 213 which cooperates with the blades 211 to hold the lugs in place in the guide ways.

To effect movement of the links and hence movement of the blades there is provided within the housing 208 and 209 a plurality of leaf springs 221 which are secured by bolts 221a to the inner walls of the housing which bear against the links 210. Rollers 222 are rotatably mounted on the upper ends of the links 210 and are adapted to engage a cam 223. The leaf springs 221 serve to continuously urge the links against the cam surface. The cam 223 is adapted to be moved vertically and is conically shaped so that vertical movement will cause the upper end of the links 210 to move inwardly and outwardly.

The vertical movement of the cam 223 is obtained through a push rod 225 which has an enlarged section 226 whereby the rod is continually against the enlarged portion 226 and against a cross member 228 in the housing 208. A crank 229 which is pivotly mounted on the cross member 205 serves to move the push rod 225 downwardly. The crank has a cam follower 230 which engages the outer cam surface 231 of the master cam 200 so that the downward movement of the push rod is controlled by the cam surface 231. An adjustable lug 232 is mounted on the end of crank 229 and engages the end of the push rod 225. This adjustable lug permits slight adjustments to be made in the length of travel of the push rod with respect to the cam. It is readily seen that the helical spring 227 acting on the push rod serves to keep the crank 229 and its cam follower 230 in constant engagement with the cam surface 231.

In the above arrangement the cam surface 231 is so designed that through most of the travel of the sealing head the push rod 225 is in down position whereby the top of the links 210 are moved outwardly by the cam 223 and hence the blades 211 are in their innermost position. When the sealing head is in substantially its lowermost position and the membrane has been inserted within the carton the push rod 225 moves upwardly and the leaf springs 221 then force the upper part of the links 210 inwardly which effects an outward movement of the blades 211. The outward movement of the blades presses the membrane against the carton which is held in position by the die members 140. Conventional cartridge heaters 233 are mounted in the housing 209 whereby heat is supplied to the pressure surfaces 234 of the sealing head as well as to blades 211 and hence a heat and pressure seal is obtained. The housing 209 of the sealing head is preferably made of brass so that sufficient heat is conducted down to the surface 234 and blades 211. Where conventional pressure sensitive coatings or other adhesives not requiring heat are used on the membranes or the cartons, the heaters may be eliminated.

As in the case with the placement head it is necessary to maintain the flaps of the cartons in a flat position when the carton moves to the sealing station. This is accomplished through a rail 240 carried on a bracket 241 which is pivotly mounted to a second bracket 242 through pivot 243. Bracket 242 is in turn secured to bracket 201. The upper end of bracket 241 has a cam follower 244 which engages a cam 245 forming part of master cam 200. The balance of the bracket 241 is such that the cam follower 244 is always urged towards the cam 245. The cam 245 is so designed that as the sealing head moves downwardly the rail 240 moves out from underneath the sealing head thus permitting the blades 211 and the surface 234 to engage a membrane which is in position on the carton and depress it to the position shown in Figure 24.

In order to obtain the insertion of the membrane and the seal of the membrane to the inner wall of the carton as well as to the flaps of the carton the cams 207 and 231 are so designed that the sealing head moves downwardly sufficiently far to cause an insertion of the membrane into the carton then to cause an expansion of the blades to effect a seal of the membrane against the inner wall of the carton. Thereupon the sealing head moves further downwardly to effect the seal by pressing the membrane and the flaps between the surface 234 and the die members underlying the flaps. This is an important feature of our invention since it contributes to obtaining maximum seal to the inner surface of the carton and further eliminates the possibility of tearing of the membrane.

After the sealing head is withdrawn from the carton die members 140 are retracted and the finished carton is then moved out of position by the conveyer and may be removed manually from the conveyer or may be removed by suitable apparatus such as an air blast or a carton inverter.

By way of summary the above described apparatus operates as follows: A carton blank 3 is placed on carriage 20 which in turn is fixed to the endless conveyer 2. The bottom flaps of the carton are extended outwardly and the top flaps of the carton at this point extend vertically upward. The carton is then moved into engagement with guide rails 36, 37 and 38 and the revolving kicker 35. Kicker 35 serves to knock down the front flap of the carton while the guide rails 36, 37 and 38 plow the other three flaps outwardly to a horizontal extended position. The flaps are maintained in this position by the guide rails throughout its travel in the machine. After the flaps are in position the carton is then moved to the first station where the flexible membrane is positioned on the carton prior to its being inserted and sealed therein. The membranes are supplied from a continuous roll 50 and are individually cut off by a pair of knives 61 and 62. A single membrane is then injected into a suitable cavity formed by sheet metal holders 74 and 75 at the base of the placement head 70. The placement head 70 is reciprocally mounted so as to receive the membrane from the cutter in an up position and lay the membrane on top of the carton in its lower-most position. When the membrane is positioned on the carton pressure pins 100 are mounted in the placement head move downwardly and pull the membrane out of the cavity and secure portions of it to the carton with a pressure seal. The reciprocal movement of the placement head and the pressure pins is all controlled through suitably designed cams 78 and 107.

After the seal is placed on the carton the conveyer then moves the carton to the second station where hydraulically movable die members 140 are first retracted to permit the carton to move in position at the second station. When the carton is in position they move inwardly to first engage the carton and position the same for reception of the sealing head. The sealing head moves downwardly when the carton is in position under the control of cam 207 sufficiently far to cause the membrane to be inserted into the carton by blades 211 but not sufficiently far to cause the surface 234 to clamp the membrane against the flaps of the carton. The blades 211 then are expanded under the control of cam 231 to effect a seal of the membrane against the inner surface of the carton. This expansion is effected through the resilient action of leaf springs 221 so that each blade moves independently of the others and hence maximum pressure is obtained at all points along the inner surface of the carton. In this way tolerances in the dimensions of the carton are compensated for which would not result were the blades to be moved positively in fixed relation to each other. When the blades are in their expanded position the die members 140 may be moved inwardly a very short distance to assist in exerting a pressure between the carton and the membrane though this is not necessary.

In another modification of our apparatus we use this external pressure of the die members alone to cause a pressure or seal between the membrane and the carton walls without the expansion of the blades 211. In fact we prefer for this purpose to use a solid sealing mandril 260 (see Figure 39) in place of the housing 209. The mandril is preferably made of brass and has cartridge heaters 261 and a thermocouple 262 for temperature control though these are not essential depending upon the adhesive being used. In place of the expanding blades to form a raised central portion in the bottom face of the sealing head, a plate 263 is secured to the bottom face of the mandril 260 by screws 264. This plate is shaped to fit closely within the carton and hence to conform the membrane to the carton as did the blades.

Obviously in this modification all the mechanism such as the push rod 225 and the cam 231 as well as that in housing 209 can be eliminated since the die members 140 exert the entire pressure when the sealing mandril has inserted the membrane. In this modification we prefer that cams 207, 171 and 172 be designed to cause the die blocks to move in to support the carton walls, then the mandril moves down to insert the membrane and seals the edges to the flaps, and then the die blocks move further inwardly to press the walls of the carton and the membrane together. The peripheral edges 265 of plate 263 are smooth so that there is no tendency for the membrane to adhere to the plate. Because the peripheral edges of the plate presents a continuous surface to the membrane, whereas with the blades there are small gaps formed upon expansion, a better seal results.

After the seal has been effected in either modification the whole sealing head is withdrawn upwardly and the die members retracted whereupon the conveyer moves the carton out from beneath the sealing head and on to any suitable point of discharge.

After one end of the carton is closed as above the carton may then be fed to a filler where the carton may be filled with food, for example, fruits and vegetables, cheese, lard or any other desired product and then the open end of the carton may be sealed in the manner described above. When a filled carton is to be put through our apparatus then the carriage for the carton is of the cavity type as shown in Figure 40 rather than the mandril type. A cylindrical shaped carton holder 250 suitably supported on a long link 26 in the chain 13 by suitable screws 251 passing through the base 252 of the holder 250 receives the carton. It will be thus seen that the open end of the carton is in the same position as when an empty carton is in position on the mandril type of carriage and hence the operation of our apparatus is identical in every respect.

Many other modifications and embodiments of our invention will occur to those skilled in the art and no limitations are intended by the above description of our preferred example except such limitations as are contained in the following claims.

We claim:

1. A machine for making leakproof packages comprising means for positioning a tubular carton having end flaps, means for supporting said flaps in an extended substantially horizontal position, means for positioning a heat sealable membrane over the carton end with the margins thereof overlapping at least portions of said flaps, heated means for depressing the membrane within the open carton, means cooperating with said heated means to press the walls of the carton inwardly whereby said membrane is sealed against the inner periphery of said carton and heated means for sealing the membrane margins to said flaps.

2. In a machine for making leakproof packages the combination comprising an intermittent conveyor, means for holding on said conveyor a tubular carton having end flaps, means for maintaining said flaps in a substantially horizontal extended position while said carton is being moved, means when said conveyor is stopped for positioning a single membrane over the carton end with the margins thereof overlapping at least portions of said flaps, movable die means when said conveyor is stopped for supporting the open end of a carton and said flaps, means for inserting said single membrane into said carton while so supported, and means for moving said die means to press said carton and membrane against said inserting means whereby said membrane is sealed to the inner walls of said carton.

3. In a machine for making leakproof packages the combination comprising an intermittent conveyor, means for holding on said conveyor a tubular carton having end flaps, means for maintaining said flaps in an extended substantially horizontal extended position while said carton is being moved, a support for a roll of flexible membranes, cut off means for separating individual membranes from said roll, means when said conveyor is stopped for positioning a single membrane over a carton end with the margins thereof overlapping at least portions of said flaps, movable die means when said conveyor is stopped for supporting the open end of a carton and said flaps, means for inserting a separated membrane into said carton while so supported by said die means, and means for moving said die means to press said carton and membrane against said inserting means whereby said membrane is sealed to the inner walls of said carton and for retracting said die means to permit the carton to be moved by the conveyor.

4. In an apparatus for sealing a flexible membrane across the open end of a carton having closure flaps, the combination comprising a sealing head having a raised central portion in its bottom face shaped to fit closely within the open end of the carton, conveyor means for positioning beneath said sealing head a carton with flaps extended and having a flexible membrane across the open end and partially overlying said flaps, collapsible die members, means for moving said members about said carton immediately beneath said extended flaps when in position beneath said sealing head, means for moving said sealing head to effect an insertion of a part of said membrane into said carton and to press a part of said membrane against said flaps supported by said die members, means for moving said die members to press at least a part of said membrane between the walls of said carton and the raised central portion of said sealing head, means for applying heat to the sealing head, and means for retracting the die members to permit the carton to be moved by the conveyor.

5. In an apparatus, a conveyor for tubular cartons having end flaps, means associated with the conveyor for positioning said end flaps in a plane substantially at a right angle with respect to the main carton body, means for maintaining said flaps in such position when said carton is being conveyed, a first station, means at said first station including a reciprocating head having pressure elements for temporarily pressure sealing a flexible coated membrane across the open end of said carton and a portion of said flaps, a second station, means at said second station for inserting the center portion of said membrane into said carton and sealing the same to said carton.

6. In an apparatus for sealing a flexible membrane across the open end of a carton having closure flaps, the combination comprising a sealing head having a raised central portion in its bottom face shaped to fit closely within the open end of the carton, means for positioning beneath said sealing head a carton with flaps extended and having a flexible membrane across the open end and partially overlying said flaps, means for moving said sealing head to effect an insertion of a part of said membrane into said carton, means for pressing at least a part of said membrane between the inner wall of said carton and the raised central portion of said sealing head, means for further moving said sealing head to press a portion of said membrane and said flaps against said first pressing means, and means for applying heat to the area where said membrane and said carton and carton flaps are pressed together.

7. In an apparatus for heat sealing a flexible membrane having a heat sealable coating across the open end of a carton having closure flaps, the combination comprising a sealing head, means for positioning beneath said sealing head a carton with flaps extended and having a flexible membrane across the open end and partially overlying said flaps, means for moving said sealing head to effect an insertion of a part of said membrane into said carton, means for pressing at least a part of said membrane between the wall of said carton and said sealing head, means for further moving said sealing head to press a portion of said membrane and said flaps against said first pressing means, and means for applying heat to the area where said membrane and said carton and carton flaps are pressed together.

8. A machine for making a leakproof package comprising means for positioning a tubular carton having end flaps, means for supporting said flaps in a substantially horizontal position, means for positioning a membrane over the carton end with the margins thereof overlapping at least portions of said flaps, a heated tubular sleeve having its inside dimensions substantially the same as the carton end, a cam member disposed and guided within said sleeve, blades having a combined surface area less than the area of said carton end and of substantially the same contour, links secured to said blades and pivotly mounted on the inner walls of said sleeve, resilient means for resiliently urging the upper end of said links against said member, and cam means for imparting relative movement to said sleeve and said member in timed relation whereby said blades are expanded by the action of said resilient means and contracted by said cam means.

9. In an apparatus, the combination comprising a conveyor for tubular cartons having end flaps, means associated with the conveyor for positioning said end flaps in a plane substantially at a right angle with respect to the main carton body, means for maintaining said flaps in such position when said carton is being conveyed, a first station, means at said first station for temporarily affixing a flexible membrane across the open end of said carton and a portion of said flaps, a second station, means at said second station for inserting at least a portion of said membrane into said carton, means for sealing the same to the inner walls of said carton and swingable guide means at said first station and said second station for maintaining said flaps in extended position when said cartons enter said stations.

10. In an apparatus, the combination comprising a conveyor for tubular cartons having end flaps, means associated with the conveyor for positioning said end flaps in a plane substantially at a right angle with respect to the main carton body, means for maintaining said flaps in such position when said carton is being conveyed, means for positioning a flexible membrane across the open end of said carton, means for inserting at least a portion of said membrane into said carton and movable guide means for maintaining at least one of said flaps in extended position when said carton is conveyed beneath said inserting means and means for moving said guide means away from said carton to provide clearance for said inserting means.

11. In a machine for making a leakproof package the combination comprising means for positioning a tubular carton having end flaps, means for supporting said flaps in a substantially horizontal position, means for supporting a roll of flexible membranes, cut off means for separating individual membranes from the roll, means for moving separated membranes from said cut off means, and means for positioning a single membrane over the carton end with the margins thereof overlapping at least portions of said flaps, said means comprising a placement head having a cavity for receiving a single membrane, means for moving said head into position above the carton, pressure sealing elements mounted in said placement head, and means for moving said sealing elements relative to said placement head to remove said membrane from the cavity and press the same on to the carton.

ROBERT A. FARRELL.
      WM. G. MUELLER.
      AUGUST BARTES, Jr.

REFERENCES CITED

The following references are of record in the file of this patent:

UNITED STATES PATENTS

| Number | Name | Date |
|---|---|---|
| 1,962,213 | Reed | June 12, 1934 |
| 2,065,828 | Schnur | Dec. 29, 1936 |
| 2,087,251 | Gough | July 20, 1937 |
| 2,106,739 | Harrison | Feb. 1, 1938 |
| 2,114,624 | Bergstein | Apr. 19, 1938 |
| 2,173,122 | Mancuso | Sept. 19, 1939 |
| 2,216,586 | Burton | Oct. 1, 1940 |
| 2,241,711 | Lowey | May 13, 1941 |
| 2,244,282 | Bergstein | June 3, 1941 |
| 2,258,611 | Hothersall | Oct. 14, 1941 |
| 2,520,224 | Sousloff | Aug. 29, 1950 |

FOREIGN PATENTS

| Number | Country | Date |
|---|---|---|
| 532,471 | Germany | Aug. 31, 1931 |